J. R. PERRINE.
LATHE FEED MECHANISM.
APPLICATION FILED JUNE 11, 1908.

912,609.

Patented Feb. 16, 1909.
4 SHEETS—SHEET 1.

Witnesses:
Elmer R. Shipley
M. S. Belden

John R. Perrine   Inventor
by James W. See
Attorney

J. R. PERRINE.
LATHE FEED MECHANISM.
APPLICATION FILED JUNE 11, 1908.

912,609.

Patented Feb. 16, 1909.
4 SHEETS—SHEET 2.

Witnesses:
Elmer R. Shipley.
M. S. Belden.

John R. Perrine
Inventor
by James W. See
Attorney

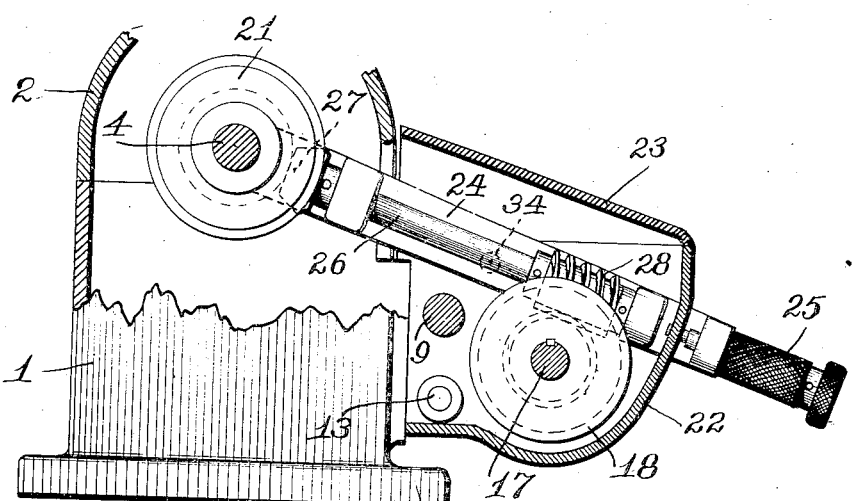

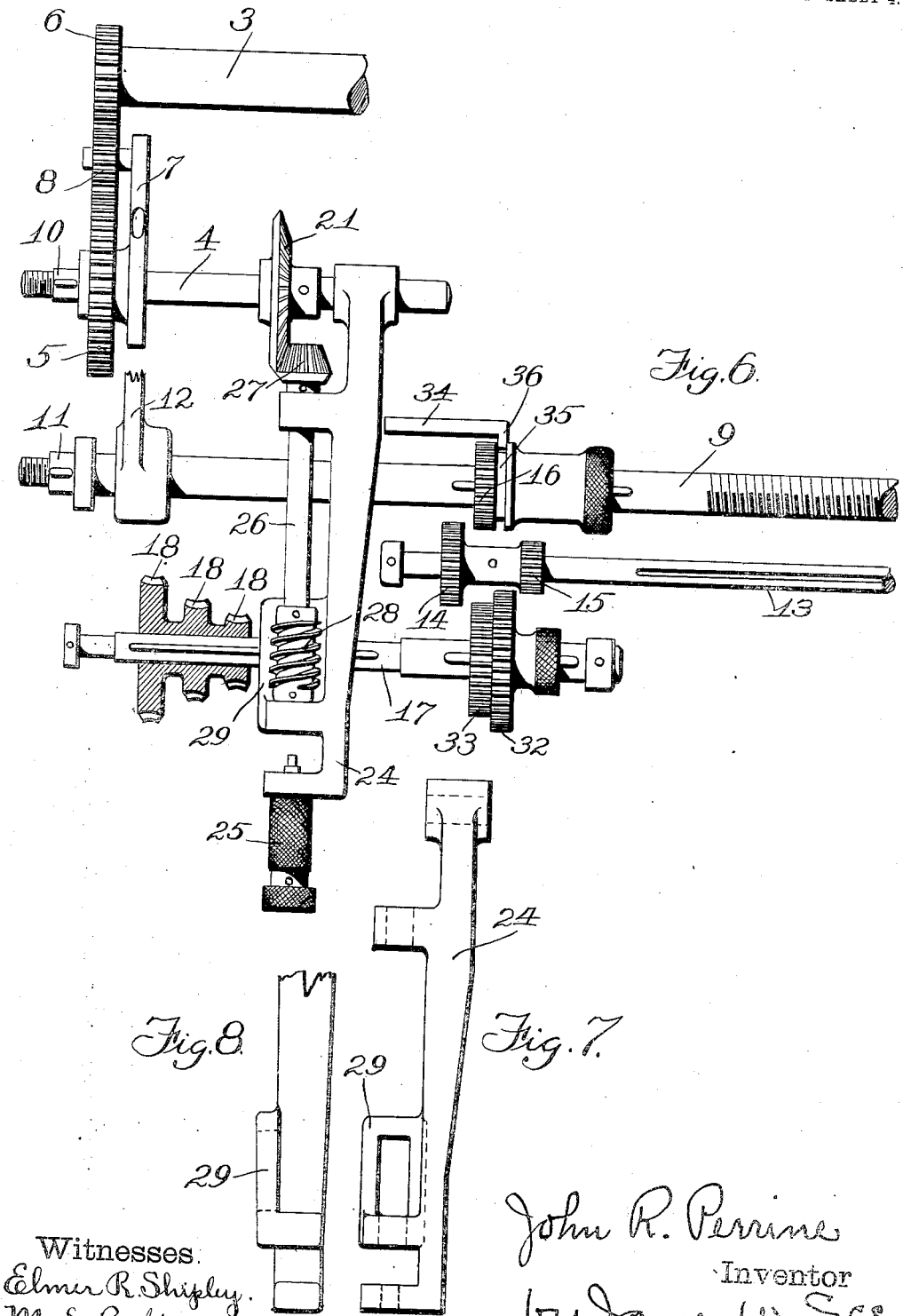

UNITED STATES PATENT OFFICE.

JOHN R. PERRINE, OF CINCINNATI, OHIO, ASSIGNOR TO THE CINCINNATI LATHE & TOOL COMPANY, OF CINCINNATI, OHIO.

LATHE-FEED MECHANISM.

No. 912,609.  Specification of Letters Patent.  Patented Feb. 16, 1909.

Application filed June 11, 1908. Serial No. 437,833.

*To all whom it may concern:*

Be it known that I, JOHN R. PERRINE, a citizen of the United States, residing at Cincinnati, Hamilton county, Ohio, have invented certain new and useful Improvements in Lathe-Feed Mechanism, of which the following is a specification.

This invention, pertaining to improvements in feed mechanism for engine lathes, will be readily understood from the following description taken in connection with the accompanying drawings in which:—

Figure 1:
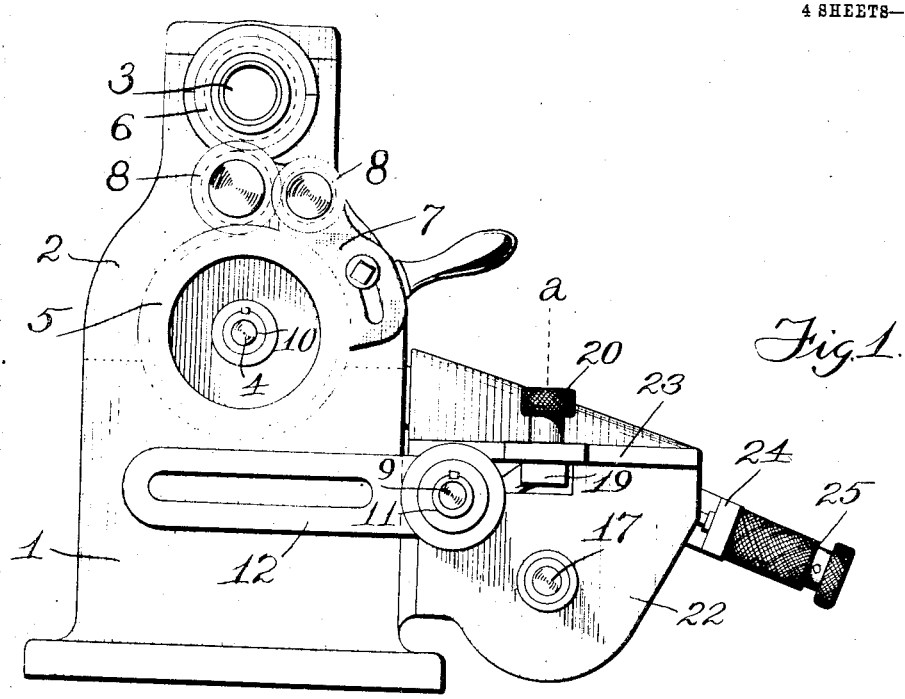
Figure 2:
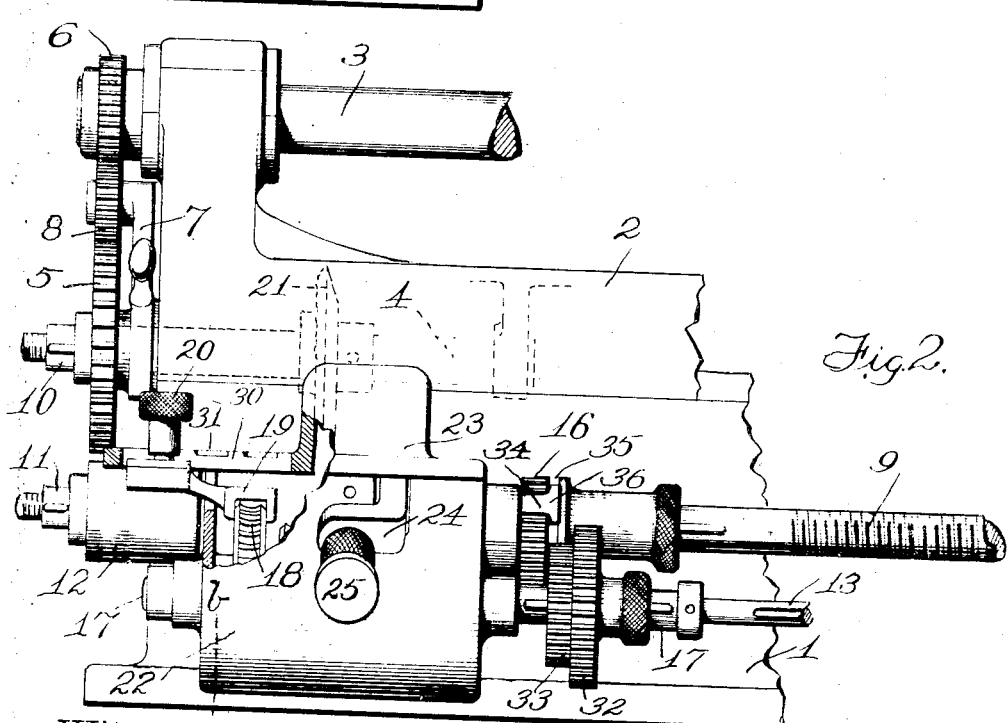
Figure 3:
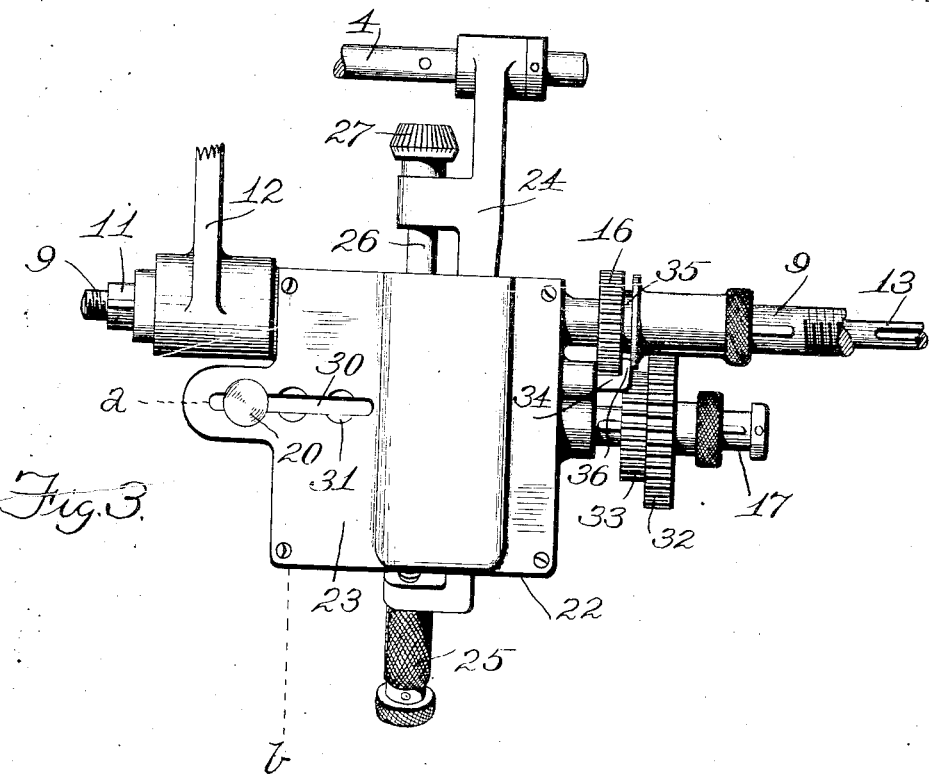
Figure 4:
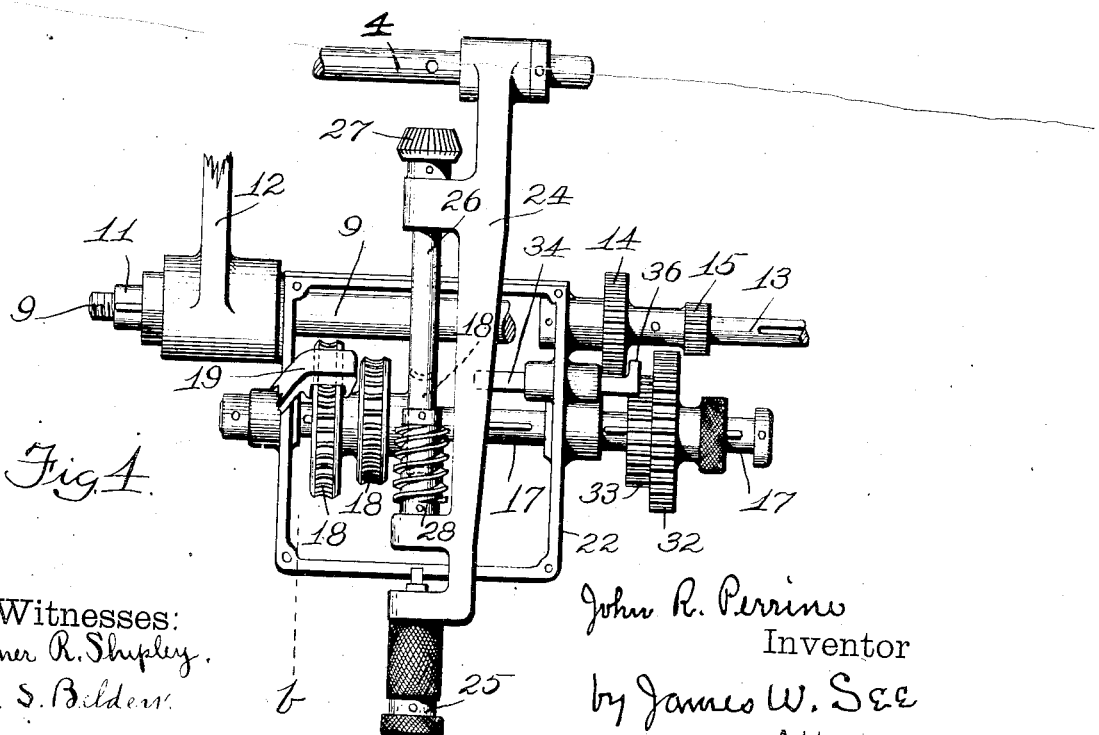

Figure 1 is an end elevation of a lathe having feed mechanism embodying an exemplification of my present invention: Fig. 2 a front elevation of a portion of the same, parts appearing in vertical section in the plane of line *a* of Fig. 1: Fig. 3 a plan of the improved feed mechanism detached from the general lathe structure: Fig. 4 a view similar to Fig. 3 but with a portion of the lead-screw omitted, and the cover of the gear box being removed: Fig. 5 a vertical transverse section of the mechanism in the plane of line *b* of Figs. 2, 3 and 4: Fig. 6 a diagrammatic view of the mechanism: Fig. 7 a plan of the speed-changing lever: and Fig. 8 a side view of a portion of this lever.

In the drawings:—1, indicates the lathe bed: 2, the headstock: 3, the lathe arbor: 4, the gear-shaft journaled in the headstock to serve as a transmitting element between the arbor and the lead-screw, this gear-shaft being often termed the "spindle": 5, a gear fast on the outer portion of the spindle: 6, a gear fast on the outer portion of the arbor: 7, the reversing tumbler: 8, the reversing pinions carried by the tumbler and adapted for coöperation between the gears 5 and 6: 9, the lead-screw: 10, the gear-seat on the outer end of the spindle 4 to receive a change-gear: 11, a gear-seat on the outer end of the lead-screw to similarly receive a change-gear: 12, the so called quadrant to support an intermediate gear between the change-gear on the spindle and the change-gear on the lead-screw: and 13, the feed rod.

All of the parts thus far referred to are, or may be, as usual in ordinary engine lathe construction and subject to all of the suitable usual modifications in those details. And the operation of the parts thus far referred to is precisely as usual, that is to say, suitable change-gears having been put upon the spindle and upon the lead-screw to coöperate through the medium of an intermediate gear carried by the quadrant, the lathe arbor will transmit rotary motion to the lead-screw at a rate dependent upon the proportioning of the change-gearing selected. The direction of motion of the lead-screw relative to that of the arbor, will depend upon the position of adjustment of the reversing tumbler, the lead-screw turning in one direction when a single one of the reversing pinions 8 is in action, as in Fig. 1, and in the other direction when the reversing tumbler is so adjusted as to bring both of the reversing pinions into active service in the transmission train. The lead-screw is to act on the lathe carriage in the usual manner, and so also is the feed rod 13.

The present invention has to do with the manner of driving the feed rod at selective rates of speed.

Proceeding with the drawings:—14, indicates a gear fast on the feed rod in the neighborhood of the headstock: 15, a second gear fast on the feed rod near gear 14, but of different size: and 16, a pinion splined on the lead-screw and adapted to be adjusted into and out of mesh with gear 14.

As thus far described it will be manifest that with the lead-screw turning at any given rate the feed rod may be at rest or, by sliding the gear 16 into engagement with gear 14, the feed rod may be turned at a rate, relative to that of the lead-screw dependent on the relative proportion of gears 16 and 14. When the feed rod is thus driven through the lead-screw its rate of turning, relative to that of the arbor, will be dependent upon the change-gears selected for use on the spindle and the lead-screw, and the direction of the turning will be dependent upon the adjustment of the reversing tumbler. A range of selective speeds for the feed rod, when the feed rod is thus driven through the medium of the lead-screw, is limited only by the number of change-gears at command. This changing of speed rates for the feed rod by changing the change-gears is not convenient and it is desirable to have at instant command a reasonable number of speeds for the feed-rod.

Proceeding with the drawings:—17, indicates a countershaft mounted parallel with the head end of the lead-screw and feed rod: 18, a plurality of unified diversely sized worm gears splined on this countershaft, the worm gears being inclosed within and the countershaft journaled in a suitable casing secured to the lathe bed: 19, a shifter-fork engaging one of the worm wheels and adapted to slide the group of worm wheels as a unit along on the countershaft: 20, a retaining screw to hold the shifter-fork in adjusted position: 21, a bevel gear fast on spindle 4: 22, the casing in which is contained the worm gears and in which is journaled the countershaft: 23, the cover of the casing: 24, a lever mounted for rocking motion on spindle 4, this lever passing through the casing and through a slot in the outer wall thereof: 25, a detent handle on the outer end of the lever to serve in rocking the lever and in detaining it in adjusted position, the detent handle having a pin to coöperate with detent holes in the outer wall of the casing: 26, a shaft journaled in the lever at right angles with spindle 4 and with its axis intersecting that of the spindle: 27, a bevel pinion on the inner end of lever shaft 26 and engaging bevel gear 21: 28, a worm fast on the outer portion of the lever-shaft and adapted to engage with such one of the worm gears as may be brought below it: 29, a flange carried by the lever, below the worm, and having a mortise adapted to freely engage over the upper portion of such one of the worm gears as may at the time be under the worm: 30, a slot in the cover 23 of the gear casing to serve as a guide for the shifter-fork 19, the detent-screw 20 passing through this slot and into the shifter-fork: 31, counterbores in the upper surface of the cover at the slot therein, these counterbores receiving a shoulder on detent screw 20 and serving to position the shifter-fork, there being one of these counterbores for each of the worm gears and so positioned, respectively, that when the detent screw engages one of the counterbores one of the worm gears will be in proper position below the worm: 32, a gear splined on the countershaft 17 and adapted to mesh with gear 15 on the feed rod: 33, a gear fast with gear 32 and adapted to mesh with gear 14 on the feed rod: 34, a long pin sliding through the inner wall of the gear casing and adapted to have its inner end take position under lever 24 and prevent that lever from descending far enough to bring its worm into engagement with any one of the worm-wheels: 35, a circumferential groove in the hub of gear 16 which slides on the lead-screw: and 36, a lug carried by the outer end of locking pin 34 and engaging in groove 35 in such manner that the sliding gear 16 brings about the sliding of the locking bolt, the length of the locking bolt being such that when gear 16 is out of engagement with gear 14, as seen in Fig. 6, the locking bolt will be out from under the lever and the lever is free to be operated.

Turning to Fig. 6, if the smallest of the worm wheels be adjusted to position under the worm and the lever be adjusted downwardly to bring the worm into engagement with that worm wheel, the countershaft 17 will be turned at a certain rate of speed, and the mortised flange 29 prevents any evil effects from side strain on the lever or endwise strain on the worm wheel due to the action of the worm. If, now, double gear 32—33 be shifted to the left gears 33 and 14 can be engaged and the feed rod will be turned at certain speed. If the double gears be shifted to the right then gears 32 and 15 can be brought into action and the feed rod will be driven at still higher speed. With the countershaft 17 turning at a given rate the adjustment of the double gears 32—33 permits of a selection of either of two speeds for the feed-rod. If the intermediate worm-gear be brought into action under the worm then a lower speed is given to the countershaft, and a still lower speed is given to it if the largest worm-gear be brought into action. In the example given, with three worm gears, the adjustment of the group of worm gears provides for three changes of speed for the countershaft, and the adjustment of the double gears 32—33 permits of the selection of two rates of transmission between the countershaft and the feed-rod, convenient and quickly operated provision thus being made for the selection of any one of six changes of speed for the feed-rod. The six rates of speed for the feed-rod are derived from the spindle 4 through the bevel gearing 21—27 and the direction of motion of the feed-rod is dependent on the adjustment of the reversing tumbler, and the lead screw is in no wise involved in the transmission train. The driving of the feed-rod through the medium of the lead-screw, and the practically unlimited range of speeds thereby available has been already explained. It will not answer to have the feed-rod geared to the lead-screw and also to the countershaft at the same time while the lead-screw and the countershaft are in motion, and a safety device is provided to take care of this matter. In Fig. 6, when the lever is down to position corresponding with the engagement of the worm with any one of the worm gears, then the countershaft is in motion and the feed-rod may be driven by means of it. At such time gear 16 on the lead-screw must not engage gear 14 on the feed-rod and locking pin 34 prevents such engagement by reason of the fact that the inner end of the locking pin would come in contact with the side of the lever and prevent gear 16 from sliding into engagement with gear 14. If it be desired to drive the feed-rod from the lead-screw then the lever must be released and lifted so that the locking bolt will pass below it, and this lifting of the lever puts it in such high position that its worm cannot engage with any worm gear, a condition under which the countershaft is at rest and nothing harmful can happen if the countershaft be put into gear with the feed-rod. And when the lever has been lifted so as to permit the locking pin to pass under it and to permit gear 16 to engage gear 14, thus gearing the lead-screw to the feed-rod, the countershaft cannot be put into motion from the worm until gears 16—14 are again disengaged so as to withdraw the locking pin from under the lever.

Makers and users of engine lathes understand that when a lathe is provided with a lead-screw and with a feed-rod the lead-screw may be reserved for screw cutting only and the feed-rod may be employed for all general feeding purposes. Or, if desired, the lead screw may also be employed for feeding purposes, and the lead-screw may, and is employed for feeding purposes, on lathes not having a feed-rod. In the present case the mechanism controlled by the lever is for turning the feed-rod but it is manifest that if the feed-rod, instead of being a mere splined rod, were in fact itself a screw, the transmitting mechanism controlled by the lever would offer the same facilities for the adjustment of the speed of that screw. In other words, the feed-rod might be a screw, and in contemplation of the possibility of it being either a splined rod or a screw I will, in the claims, apply to it the term "feed-shaft" as comprehending either a screw shaft or a splined shaft.

I claim :—

1. Lathe feed mechanism comprising, a lathe arbor, a spindle turned thereby, a bevel-gear on the spindle, a lever rocking on the spindle, a detent for the lever, a shaft journaled in the lever at right angles to the spindle, a bevel-gear fast on the shaft and engaging the bevel-gear on the spindle, a worm on the shaft, a feed-shaft, a countershaft, gearing connecting the feed-shaft and the countershaft, a plurality of unified worm-gears splined on the countershaft and adapted for alternative engagement with the worm, mechanism for shifting the worm-gears on the countershaft and for securing them in such position that either of the worm gears may be engaged by the worm, and a device carried by the lever and adapted to engage such worm wheel as may be in action and prevent endwise displacement of the worm-gear relative to the lever, combined substantially as set forth.

2. Lathe feed mechanism comprising, a lathe arbor, a spindle turned thereby, a bevel-gear on the spindle, a lever rocking on the spindle, a detent for the lever, a shaft journaled in the lever at right angles to the spindle, a bevel-gear fast on the shaft and engaging the bevel-gear on the spindle, a worm on the shaft, a feed-shaft, a countershaft, gearing connecting the feed-shaft and the countershaft, a plurality of unified worm-gears splined on the countershaft and adapted for alternative engagement with the worm, mechanism for shifting the worm-gears on the counter-shaft and for securing them in such position that either of the worm gears may be engaged by the worm, and a mortised flange carried by the lever and adapted to engage the selected worm-gear sidewise and prevent the worm-gear from shifting endwise relative to the lever, combined substantially as set forth.

3. Lathe feed mechanism comprising, a lathe arbor, a spindle turned thereby, a bevel-gear on the spindle, a lever rocking on the spindle, a detent for the lever, a shaft journaled in the lever at right angles to the spindle, a bevel-gear fast on the shaft and engaging the bevel-gear on the spindle, a worm on the shaft, a feed-shaft, a countershaft, gearing connecting the feed-shaft and the countershaft, a plurality of unified worm-gears on the countershaft and adapted for alternative engagement with the worm, a fixed casing inclosing the worm-gears, a shifter-fork engaging one of the worm-gears and having sliding engagement in a part of the casing, and a screw for binding the shifter-fork in adjusted position, combined substantially as set forth.

4. Lathe feed mechanism comprising, a lead-screw, a lathe arbor, a spindle turned thereby, a bevel-gear on the spindle, a lever rocking on the spindle, a detent for the lever, a shaft journaled in the lever at right angles to the spindle, a bevel-gear fast on the shaft and engaging the bevel-gear on the spindle, a worm on the shaft, a feed-shaft, a countershaft, gearing connecting the feed-shaft and the countershaft, a plurality of unified worm-gears splined on the counter-shaft and adapted for alternative engagement with the worm, mechanism for shifting the worm-gears on the countershaft and for securing them in such position that either of the worm-gears may be engaged by the worm, a sliding gear mounted on the lead-screw and adapted to engage a gear on the feed-shaft, and a sliding locking pin operated by said sliding gear and adapted to engage said lever and prevent the engagement of said sliding gear if the worm is in engagement with one of the worm-gears and to take position under the lever and prevent the engagement of the worm with a worm-gear if the sliding gear on the lead-screw is in action, combined substantially as set forth.

5. Lathe feed mechanism comprising, a lathe arbor, a spindle turned thereby, a bevel-gear on the spindle, a lever rocking on the spindle, a detent for the lever, a shaft journaled in the lever at right angles to the spindle, a bevel-gear fast on the shaft and engaging the bevel-gear on the spindle, a worm on the shaft, a feed-shaft, a counter-shaft, gearing connecting the feed-shaft and the counter-shaft, a plurality of unified worm-gears splined on the countershaft and adapted for alternative engagement with the worm, mechanism for shifting the worm-gears on the counter-shaft and for securing them in such position that either of the worm-gears may be engaged by the worm, a lead-screw, change-gear receiving features on the spindle and lead-screw, and disengageable gearing connecting the lead-screw and feed-shaft, combined substantially as set forth.

6. Lathe feed mechanism comprising, a casing, a shaft journaled therein, a plurality of gears splined on the shaft within the casing, a casing-part provided with a slot parallel with said shaft and having a series of counterbores forming depressions in said casing-part at each side of the slot, a shifter-fork engaging one of said gears and having a part fitted to slide in the slot opposite the counter-bored surface thereof, and a detent screw passing through said slot and into said shifter-fork and having a portion adapted to enter any selected one of said counter-bores, whereby said detent screw serves to position the shifter-fork and gears longitudinally and then clamp the shifter-fork firmly to the casing-part, combined substantially as set forth.

JOHN R. PERRINE.

Witnesses:
F. McCall,
W. C. Heindel.